July 10, 1962 J. F. ROSENTHAL 3,043,685

XEROGRAPHIC AND MAGNETIC IMAGE RECORDING AND REPRODUCING

Filed July 18, 1957

INVENTOR.
JOSEPH F. ROSENTHAL
BY Frank A. Steinhilper
ATTORNEY

United States Patent Office 3,043,685

Patented July 10, 1962

3,043,685

XEROGRAPHIC AND MAGNETIC IMAGE RECORDING AND REPRODUCING

Joseph F. Rosenthal, Rochester, N.Y., assignor to Xerox Corporation, a corporation of New York Filed July 18, 1957, Ser. No. 672,805
2 Claims. (Cl. 96—1)

This invention relates in general to image recording and in particular to image recording and printing by the deposition of attractable material on an image surface.

It is known in the art of xerography that an image may be recorded and printed by the deposition of electrically attractable material on an electrostatic or xerographic latent image. Most usually, the electric image is formed by the combined action of a light image and an electric field to form an electrostatic charge pattern on a light responsive insulating surface. The electric image when formed in this manner, or by other means, may then be developed by the deposition thereon of finely divided electrically attractable material such as, for example, an electrically charged powder. The developed image may then be permanently fixed on the image surface or may, if desired, be transferred to another print support surface.

The art of xerography has been employed for the recording of images of many sorts. One of the most promising fields of activity has been found to be the production and copying of letters, documents and business records, and in reproductions of this type of copy it is frequently desirable to repeat a portion of the image, design, or information, through a plurality or multiplicity of copies and to vary some of the image or information from one copy to another. Thus, for example, it is frequently desirable in business systems to reproduce information on standardized forms, letterheads, and the like. In the prior art when it has been desired to reproduce such forms and systems work, it has been the usual practice to create an new electrostatic latent image of the entire document including not only the variable information, but the repetitively reproduced information and design. This has, of course, necessitated changing the entire electrical and developed image in order to accommodate what may frequently be a minor change in the over-all image, and thus has necessitated the presentation of both the variable information and the fixed form to the image surface for each successive reproduction or copying cycle.

In accordance with the present invention a combination image can now be formed comprising persistent image areas to be reproduced in a plurality of copies and variable image areas to be varied as desired from one copy to another. This new and desirable result is achieved by the formation of two types of images each capable of being developed by attractive deposition of finely divided particulate material. The one image may comprise a magnetic image or pattern in a magnetically retentive material or surface, and the other image may comprise an electrostatic image or pattern in an electrostatically retentive material or surface. Thus, for example, a suitable image material having both magnetically retentive image areas and electrostatically retentive image areas may have imposed thereon both a magnetic image and an electric image and each of such images may be erased or modified independently of the other while, nevertheless, both of such images may be separately or simultaneously developed.

According to one embodiment of the invention a persistent or reusable image may be formed by magnetic activation of a magnetically retentive image area to provide, for example, a business form, or the like to be reproduced for a plurality of copies, and a variable electrostatic image may be imposed on electrostatically retentive image areas representing information or the like to be varied after one or a plurality of image printing cycles.

The general nature and scope of the invention having been set forth, the invention will now be explained in conjunction with the accompanying drawings in which.

Figure 1:
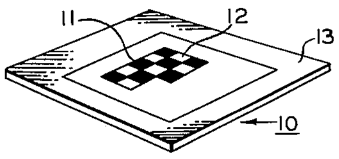
FIG. 1 is a diagrammatic view of an image plate according to one embodiment of the invention.

In one form of the present invention, the image-forming member is an image-receiving surface or layer having within its image area boundary magnetically retentive areas and electrostatically retentive areas. One form of such an image member is illustrated in FIG. 1 where there is shown an image plate generally designated 10 comprising a plurality of magnetically retentive areas or dots 11 interspersed with a plurality of electrostatically retentive areas or dots 12 on a support base 13. Desirably, the magnetic areas 11 and electrostatic areas 12 may be built on the surface in a mosaic or mosaic-like pattern and may be adapted to receive a dot-like image of either magnetic or electrostatic character much resembling a conventional half-tone image. In this manner a magnetic pattern can be imposed on the magnetic image areas within a suitable image area boundary, and an independent electrostatic image may be imposed on the similar electrostatic elements of the mosaic.

Figure 2:
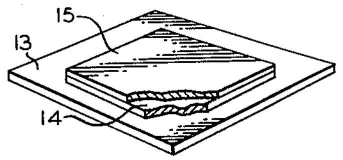
FIG. 2 is a diagrammatic view of a layer image plate according to a second embodiment of the invention.

In FIG. 2 is illustrated an image plate according to a second embodiment of the invention wherein a support base 13 has a magnetic coating or layer 14 and an electrostatic overcoating or overlayer 15. The electrostatic overlayer 15 may, as desired be an electrostatically retentive insulating layer adapted to receive and retain an electric image or may if desired be a photoconductive insulating layer adapted to form and retain an electric image.

For example, the image plate of FIG. 2 may consist of a suitable support base which may be either electrically insulating or electrically conductive, including metal, paper, cloth, plastic, glass, and the like. Coated on the support base is a magnetically retentive layer as, for example, a metal layer or a layer of a pigment binder composition of iron powder, magnetic oxide pigment or of other suitably magnetically retentive material desirably but not necessarily in a binder layer. When the image plate is also employed as a photosensitive electrostatic image plate, it is desirable that either the magnetic layer or the support base or both be electrically conductive.

Coated on one surface of the plate and desirably on the magnetically coated plate surface is a suitable electrostatically retentive over-layer. According to one embodiment of this invention the electrostatically retentive overlayer may be a photoconductive insulating layer such as, for example, a layer of vitreous selenium, anthracene, sulfur, or the like, or a photoconductive pigment-binder layer such as, for example, a phosphor or similar photoactive material in an insulating binder. Suitable photoactive materials include the sulfides, oxides, and selenides of calcium, zinc, cadmium, and the like, as well as other materials recognized in the art as being conductively activated by the action of light or other activating radiation. A suitable photoconductive insulator may, therefore, be coated on the magnetic under-layer to provide an image plate retentive of a magnetic image and likewise retentive of an electric image.

Figure 3:
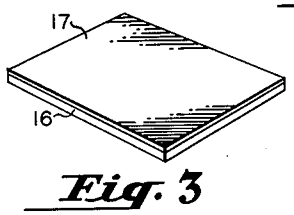
FIG. 3 is a diagrammatic view of a flexible image plate according to another embodiment of the invention.

In FIG. 3 is illustrated another embodiment of an image sensitive member consisting of an electrically insulating layer 16 and a magnetic coating layer 17. If desired, the electrically insulating layer 16 may be a self-supporting insulating film acting as a support base for the magnetic layer and including, for example, film-forming organic materials such as regenerated cellulose, cellulosic esters and ethers, and other cellulosic components, as well as synthetic resins such as polystyrene, polyethylene polyesters, and the like. A particularly desirable support base is a film or web of an insulating polyester film available under the name "Mylar." Such a support base may be coated with magnetic pigment particles in a film-forming binder.

Image plates may also be made by coating on a conductive base a layer of insulating binder composition comprising a magnetizable pigment optionally together with a photoconductive pigment in an insulating film forming binder. Plates may be of various forms to suit particular needs, such as flat plates, cylinders, or flexible webs.

In any of the image plates disclosed above it is apparent that limited areas, or the entire image area, may be employed for one of the two portions of the combined image. Thus, for example, if it is desired to produce variable information in a small portion of a relatively fixed image, it may be desired to employ the electrically sensitive dots 12 of FIG. 1, or the over-layer 15 of FIG. 2 in limited portions of the total image area. Similarly, if the relatively more permanent image is of small and predictable size, it may be desired to employ only restricted areas of magnetically sensitive material. For general purpose operation, however, it is desirable to have the two types of sensitivity through the entire image area.

In use and operation any of the combined image plates disclosed above, may be employed through a series or cycle of operation in which many of the steps may be carried out simultaneously, or in which the order of steps may be reversed as will be apparent to those skilled in the art. A typical illustration will, however, be presented in detail with the understanding that it is intended to be illustrative and not limiting.

A suitable image plate such as, for example, the plate of FIG. 2, comprising an insulating support web having a magnetic layer on that surface, is coated by deposition on the magnetic surface of a thin conductive layer such as, for example, a thin layer of evaporated metal or the like. On this layer is coated a photoconductive insulator such as a composition of finely powdered zinc oxide in an insulating resin binder. This coated web is characterized by the ability to form a persistent magnetic image in response to an applied magnetic field and by the ability to form an electrostatic image in response to the combined action of light and applied electric field such as exposure to a light image while in an electrically charged condition. A persistent magnetic image may be formed in or on the magnetic layer by placing suitable magnetic elements on either side of the layer and, if desired, by pulsing a field-forming magnetic impulse to one or both of such elements. Thus, for example, a strip bar magnet or electromagnet may be placed against one surface of the member and a counter surface or electrode of a magnetic material such as iron may be suitably placed behind the surface to produce a magnetic pattern in the layer corresponding to a solid line. Alternatively other image-forming methods may be employed such as are disclosed in the General Electric Review, July 1952, pages 20, 21, 22, and 61. In this manner, a suitable persistent image such as, for example, a business form, may be produced in the magnetic layer. Desirably, the magnetic image may be first produced and the image member bearing this magnetic form image may then be processed repetitively through the following process steps.

A variable electric image is formed on the combined member either before or after forming the magnetic image by charging the electrostatic image surface by suitable means such as, for example, rubbing, brushing, or the like, or by depositing uniform charge on the surface by passing thereacross a corona discharge electrode. After the surface has been charged a desired image is formed thereon by exposing the charged surface to a suitable light image such as an image of information to be produced. The electrostatic image may desirably be in register with a business form represented by the magnetic image. There is thus produced a magnetic form image and an electrostatic image corresponding to variable information, the two images being formed by independent and mutual compatible process steps to form a single combined image.

The combined image may then be developed or made visible in simultaneous or separate development steps. The magnetic image can be developed by bringing to the image surface a magnetically attractable material such as, for example, finely divided ferrite, iron filings, iron dust, iron oxide, or the like, or other suitably magnetically attractable material as is known in the art. Similarly, the electric image may be developed by presenting to the image surface suitable electrically charged, finely divided particles such as a charged cloud or gas suspension of powder or mist, or finely divided particles supported by a suitable carrier such as granular carrier particles or an insulating liquid or brushlike fibres which are employed in the art of xerography. Suitable development means and apparatus are disclosed in Carlson 2,297,691, Walkup 2,550,-738, and Landrigan et al. 2,725,304. The two images may be developed in either order and thus the magnetic image may be first developed or if desired the electrostatic image may be first developed.

According to a preferred embodiment of the invention the magnetic and electrostatic images are simultaneously developed with a single developing material. In Wise Patent 2,618,552 it is disclosed that an electrostatic image can be developed by cascading across the image surface an image of suitable granular carrier particles and fine electrically charged powder particles which are appropriately frictionally charged by contact with each other. It is further disclosed in copending application Ser. No. 339,208 that magnetic powder particles may be employed in the development mixture of the Wise patent. According to the present invention a powder carrier mixture may comprise a suitable granular material such as, for example, a resin-coated bead or the like in admixture with finely divided developer powder such as, for example, magnetically attractable pigment in a thermoplastic resin binder. When this mixture is cascaded across the combined surface in the present invention, both the magnetic and electrostatic images are simultaneously developed, the magnetic image by magnetic attraction of the pigment in powder particles, and the electrostatic image by electric attraction of the powder particles which are electrostatically charged by triboelectric contact with the carrier. Alternatively, the image may be developed according to the methods of Landrigan, with either/or Carlson, wherein electrostatically charged magnetically attractable finely divided material in the absence of the carrier is suitably directed against the image surface. Similarly, the magnetic pigmented resin powder may be suspended in a dielectric liquid and poured across the image surface or applied by immersion to give simultaneous development of the two images, or the magnetic resin powder may be magnetically held to a bar magnet or the like and brushed across the surface to deposit simultaneously on both image components.

Desirably, the deposited or developed image may be transferred to a print support surface to produce a final copy, or, if preferred, the image may be permanently affixed to the sensitive image member. According to a preferred procedure, an image formed on the image member is transferred to a print support sheet such as a sheet of paper by placing the paper against the developed image and by applying an electric field in a direction to move the electrostatically charged powder to the paper. The field may be applied by means of an electrode in contact with the paper or by electrostatically charging the reverse side of the paper by passing thereacross a corona discharge electrode. The result of such transfer operation is a visible image on a support base which may be fused thereon by heating in an oven or by means of solvent or volatile solvent vapor. The product is a print of the combined magnet and electric image. Transfer may also be effected by pressure to an adhesively coated surface such as, for example, paper coated with latex or slightly moistened gelatine.

After transfer of the developed image the sensitive image plate may be prepared for the second cycle. If a residual powder image remains on the plate after transfer, this residual image may be removed by successive transfers or by brushing or the like, or, if desired, by cascade methods as disclosed in Copley U.S. 2,484,782. Such residual image removing means will remove the image powder, while leaving the magnetic component image in its original force and effect. A new electrostatic image may be produced on the image member surface by the same method employed for production of the first electrostatic image to produce thereon either the same image or a modified image. Thus, for example, if the magnetic image is a business systems form the successive electrostatic images may be suitable information or the like to be printed on the form.

Alternatively, the image may be magnetically transferred and removed from the surface so as to leave the electrostatic image intact, in which case a new magnetic image can be superimposed on the old electrical image. The resulting new combined image comprising generally the persistent magnetic image and the newly formed electrostatic image is again developed, and, if desired, the developed image transferred to a suitable print support surface.

It has been found that the magnetic image may be formed and reproduced through many hundreds of copies without deterioration in quality and that an electrostatic image of variable information may be imposed thereon and suitably printed therefrom through hundreds of cycles of operation.

Figure 4:
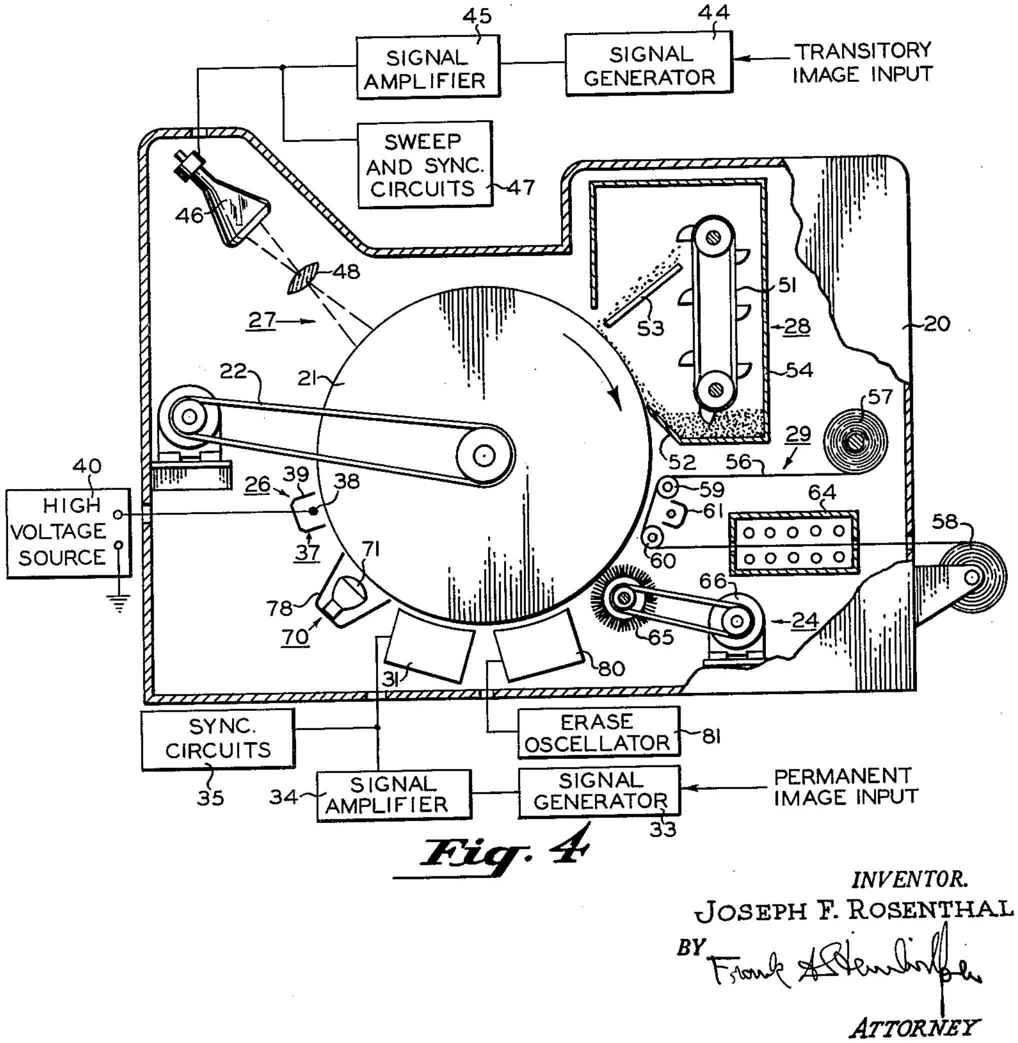
FIG. 4 is a diagrammatic view of an image-forming and reproducing apparatus according to one embodiment of this invention.

In FIGURE 4 is illustrated a device for recording and printing a combination image considering of a transitory or data image varying from copy to copy and a business form image intended to be reproduced through a plurality of copies. In the figure is illustrated a cylinder drum 21 within a light-tight cabinet 20. Disposed around the cylinder is a plurality of operation stations including a cleaning station generally designated 24, a permanent image station 25, a charging station 26, a transitory image station 27, a developing station 28, and a transfer station 29. The cylinder 21 is a rotatably mounted cylindrical or drumlike surface having a combination image layer disposed around its circumference. The image layer may be any of the image layers described heretofore or any suitable image layer adapted to receive an electrostatic image and a magnetic image. The drum is adapted to be rotated by suitable drive means such as, for example, an electric motor or the like mounted on pulley belt 22 and, similarly, the other power driven mechanism may likewise be driven by this or equivalent power supply.

At the permanent image station 25 is positioned a magnetic recording station 31 which may comprise suitable magnetic elements or probes adapted to place a permanent magnetic image corresponding to a business form or the like on the drum or image layer 21. A permanent image input such as, for example, a pulse corresponding to a coded image is fed into a signal generator 33 which transforms the image input pulse to a desired image signal, thence to a signal amplifier 34. The signal amplifier and suitable synchronizing circuits 35 feed the amplified pulse to the magnetic recording station whereby the permanent image is imposed on the image surface.

Suitably positioned adjacent to the path of motion of the cylinder 21 is a surface charging device such as, for example, a corona discharge electrode 37 which consists of one or more fine conductive strands 38 disposed within a shield 39 and operably connected to a high voltage D.C. power supply 40. The corona discharge electrode is positioned and adapted to spray an ion discharge onto an image surface in a manner as is disclosed in application Ser. No. 154,295.

Positioned subsequent to the charging station 26 is the transitory image station 27 wherein a variable image such as alphanumeric data may be applied to the image surface, for example, by exposure to a light or optical frame. As illustrated in the figure the transitory image input is fed to a signal generator 44 which in turn feeds to a signal amplifier 45. The amplifier along with suitable sweep and synchronizing elements 47 feeds to a cathode ray tube 46 or like display device. Desirably, a cathode ray tube may be employed with horizontal sweep circuits to impart the horizontal component of an image while the rotation of the drum is synchronized to impart the vertical component of said image. A suitable lens 48 or the like is positioned and adapted to project the cathode ray tube scan onto the surface of the drum 21.

Positioned next adjacent to the transitory image station is a development station whereat finely divided image material or developer is presented to the image surface. As illustrated in the figure a bucket conveyor 51 is positioned to transport developer material from a catching hopper 52 to a delivery chute 53 wherein it is delivered to and cascaded across the surface of drum 21, being returned by gravity to the catching hopper 52. A suitable supply of developer 54 such as the powder carrier developer hereinbefore described may be placed within the developer unit for circulation through the developing system.

Next adjacent to the developing station 28 is the transfer station 29 whereat a web of image transfer material 56 passes from a feed roll 57 to a takeup roll 58 around guide rollers 59 and 60 positioned to maintain contact between the web 56 and the cylinder surface. A corona discharge electrode 61 which may be of the same construction and adapted to cause ion discharge of the same polarity as that of electrode 37 is positioned behind the image-receiving web 56 and is adapted to spray electric charge onto the exposed surface of the web while the web is in contact with the cylinder surface. An image fixing or fusing device such as a heating oven 64 or a vapor chamber is positioned between the cylinder 21 and the takeup roll 58.

Positioned around the surface of the cylinder 21 at a point beyond the image transfer station 28 and prior to the charging station 26 is a cleaning station generally designated 24. The cleaning station may comprise, for example, a rotatable fur brush 65 adapted to be driven by a suitable drive means such as, for example, a motor 66 such as to be rapidly rotatable in contact with the cylinder surface. Positioned between the image development station 28 and the charging station 26 and preferably between the cleaning station 24 and the charging station 26 is a transitory image erasure station 70 which may comprise, for example, a suitable lamp or flood lighting means 71 mounted within a light shield 72 and positioned to shine light on the drum surface for discharging residual electric charge by action on a photoconductive image layer. Similarly, a magnetic erase head 80 is positioned between development station 28 and recording station 25 to erase the magnetic image when desired. An erase oscillator 81 provides the alternating current used for erasure, as is well-known in the magnetic recording art.

The device as illustrated in FIGURE 4 is adapted to place on the image surface a combination image consisting of a permanent magnetic image adapted to be reproduced through a plurality of cycles and a transitory image adapted to be varied from cycle to cycle. It is to be understood that a suitable image source may be the output of a computer, an electronic recorder, or other device as is known in the art for converting data, information, or the like, to an electric signal. The appropriate permanent image output of such a computer or recording device or an independent signal corresponding, for example, to a printed form for use in conjunction with data output is fed to the magnetic signal generator 33 and the appropriate transitory image output of such a computer or recording device such as alphanumeric data output is adapted to be fed to the electrostatic signal generator 44. Either as a preliminary step or operation prior to recording of the transitory image signal or as a coodinating part of such transitory image recording the recording drum 21 bearing the image surface is rotated so as to pass the image surface through the magnetic pulse output at the permanent image recording station 25. The desired image signal is thereby recorded on the magnetically responsive component of the combined image surface. The transitory image is then either simultaneously or subsequently recorded on the combined image surface by the repetitive steps of charging the image surface at charging station 26, exposing to the projected image at transitory image recording station 48 and developing at the developing station 28. The recorded and developed images are then electrically transferred to the image-receiving web at transfer station 29 and thereafter any residual image may be removed therefrom at the image cleaning station 24. If desired, residual electrostatic image forces may be dissipated by flooding the image surface with light from lamps 71. The combined action of electric field and exposure to the light image as accomplished by charging station 26 and exposure station 27 causes the formation of an electrostatic latent image on the cylinder surface, the electrostatic latent image corresponding to the desired transitory image input. This transitory image is thereby superimposed on the magnetic or permanent image and the resulting images are simultaneously developed at developing station 28 by cascading thereacross a mixed electrostatic and magnetic developer as described hereinbefore. The application of electrostatic field at the image transfer station 29 causes the transfer of this image to the image-receiving web 56 whereon it may be fused or permanently fixed into image configuration by suitable heat or solvent fusing means. It is particularly to be observed that the image developing, transfer, and cleaning operations performed at the various points and stations adjacent to the path of motion of the cylinder surface are inert with respect to the formation or dissipation of the magnetic image whereby the magnetic image is repetitively developed during cycle after cycle at the image development station.

What is claimed is:

1. In a method of reproducing a two component image pattern comprising forming a magnetic latent image of a first component of said image pattern in a magnetizable surface and forming an electrostatic latent image of the second component of said image pattern in a photoconductive insulating surface and developing said magnetic latent image and said electrostatic latent image simultaneously with a composite electrostatically and magnetically attractable developer; the improvement of forming said magnetic latent image and forming said electrostatic latent image on a plate having a single composite reproducing surface formed of separate and distinct coplanar portions of photoconductive and magnetic materials respectively, by applying a magnetic field in image configuration to said surface to form the magnetic latent image portion on the magnetic material portion of said surface, and exposing said surface to an image pattern of light and shadow after the application of a uniform electrostatic field through said plate, to form the electrostatic latent image portion on said photoconductive material portion of said surface.

2. In a method of reproducing a two component image pattern comprising forming a magnetic latent image of a first component of said pattern in a magnetizable surface, forming an electrostatic latent image of the second component of said image pattern on a photoconductive insulating surface, developing said magnetic latent image and said electrostatic latent image simultaneously with a composite electrostatically and magnetically attractable developer and including forming a halftone developed electrostatic image in the composite image from a continuous-tone original; the improvement of forming said magnetic latent image and forming said electrostatic latent image on a plate having a single composite reproducing surface formed of separate and distinct coplanar portions of photoconductive and magnetic materials respectively and comprising a continuous electrically conductive magnetic material matrix with a uniform halftone pattern of photoconductive material insulating dots inset into the surface thereof, by applying a magnetic field in image configuration to said surface to form the magnetic latent image portion on the magnetic material portion of said surface, and applying an electrostatic field through said plate and exposing said surface to a light and shadow pattern of the continuous-tone original, to form a halftone electrostatic latent image portion on said photoconductive material portion of said surface.

References Cited in the file of this patent

UNITED STATES PATENTS

| | | |
|---|---|---|
| 2,297,691 | Carlson | Oct. 6, 1942 |
| 2,357,809 | Carlson | Sept. 12, 1944 |
| 2,414,793 | Becker | Jan. 28, 1947 |
| 2,552,640 | Morin | May 15, 1951 |
| 2,599,542 | Carlson | June 10, 1952 |
| 2,819,963 | Hamm | Jan. 14, 1958 |
| 2,823,999 | Hamm | Feb. 18, 1958 |
| 2,857,290 | Bolton | Oct. 21, 1958 |
| 2,887,632 | Dalton | May 19, 1959 |
| 2,907,674 | Metcalfe et al. | Oct. 6, 1959 |

OTHER REFERENCES

Atkinson et al.: "Ferrography," Journal of The Franklin Institute, vol 252, No. 5, November 1951, pages 373–381.

Berry et al.: "Ferromanetography—High Speed," General Electric Review, July 1952, pages 20–22 and 61.